United States Patent
Parodi et al.

[11] Patent Number: 5,960,561
[45] Date of Patent: Oct. 5, 1999

[54] METHOD AND APPARATUS FOR ROASTING COFFEE BEANS IN SMALL QUANTITIES

[75] Inventors: Daniel J. Parodi, Redwood City, Calif.; Matthew T. Fisher, Reno, Nev.

[73] Assignee: Peter J. Listro Associates, Ltd., New York, N.Y.

[21] Appl. No.: 08/851,741

[22] Filed: May 5, 1997

[51] Int. Cl.$^6$ .................................................... F26B 19/00
[52] U.S. Cl. .............................................. 34/550; 34/218
[58] Field of Search ............................ 34/550, 565, 576, 34/582, 218; 99/286

[56] References Cited

U.S. PATENT DOCUMENTS

| | | | |
|---|---|---|---|
| 3,964,175 | 6/1976 | Sivetz | 34/57 |
| 4,422,247 | 12/1983 | Deschaaf | 34/48 |
| 4,477,982 | 10/1984 | Cotton | 34/48 |
| 4,738,034 | 4/1988 | Muramatsu et al. | 34/43 |
| 5,394,623 | 3/1995 | Sewell | 34/544 |

*Primary Examiner*—Henry A. Bennett
*Assistant Examiner*—Malik N. Drake
*Attorney, Agent, or Firm*—Haverstock & Owens LLP

[57] ABSTRACT

A technique for roasting coffee beans to a desired doneness. A fan forces air through a heating element and into an opening in a funnel-shaped bottom of a roasting chamber. A stream of heated air lifts beans located over the opening until they fall out of the stream, allowing other beans to fall over the opening. Thus, the beans continuously circulate in a fountain-like manner. A temperature probe in the roasting chamber contacts the circulating beans. Green coffee beans are placed in the roasting chamber, a desired doneness is selected, and the fan and heating element are activated. As the beans roast, a temperature sensed by the temperature probe is cumulated over time, forming a cumulated value. In addition, the heating element and speed of the fan are controlled to maintain the rate at which the sensed temperature is rising within preselected limits. At any point in time during the roasting process, the cumulated value is highly representative of the doneness of the beans. When the cumulated value reaches a value representative of the desired doneness, the heating element is disabled. To quench the beans, the fan remains on for a period after the heating element is disabled. A cover for the roasting chamber includes a channel. When the cover is in a first position, the channel directs hot air and chaff into a filter. When the cover is in a second position, the channel serves as pour spout for pouring the roasted beans out of the roaster, such as into a grinder.

26 Claims, 9 Drawing Sheets

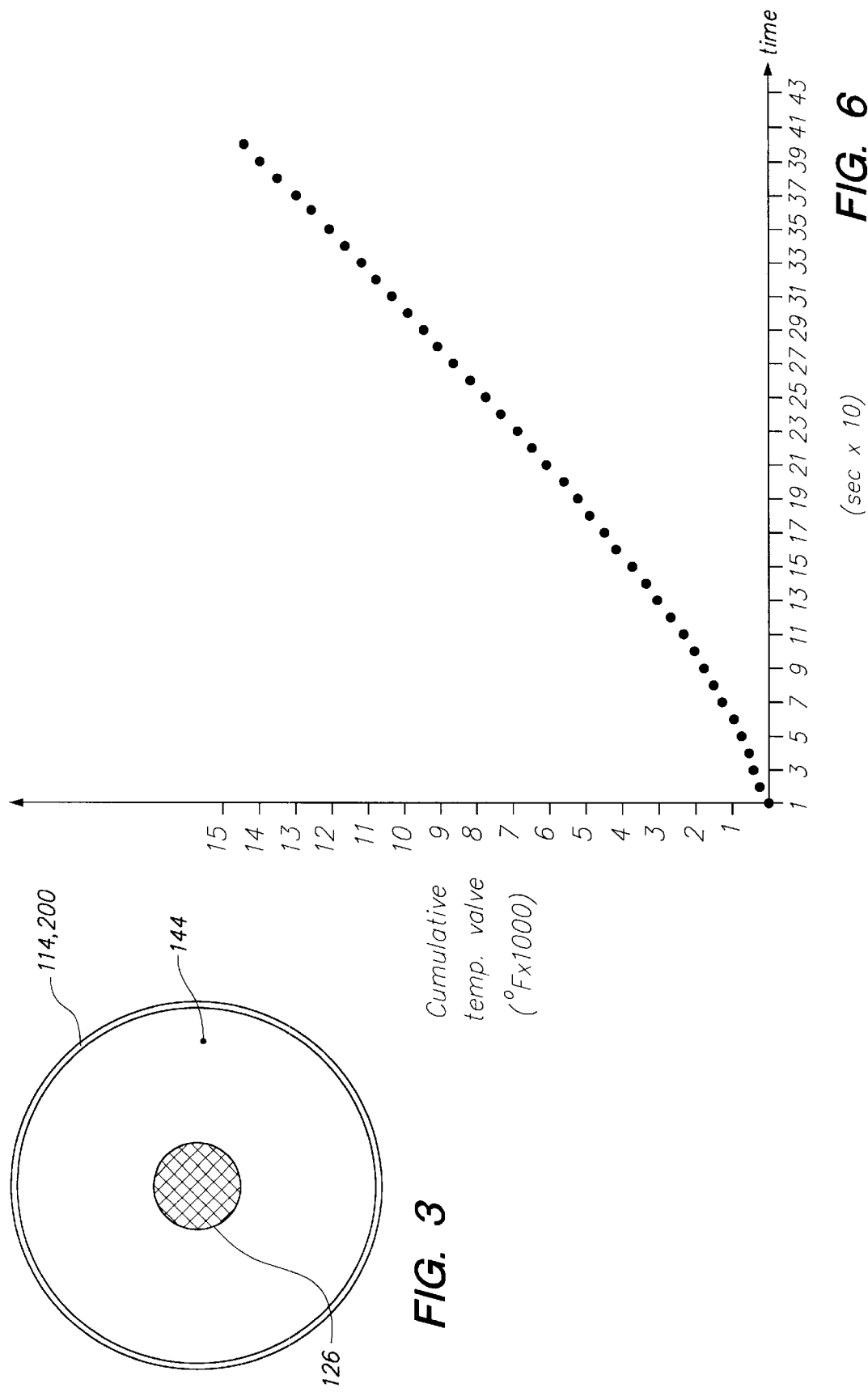

| FIG. 4A | FIG. 4B |

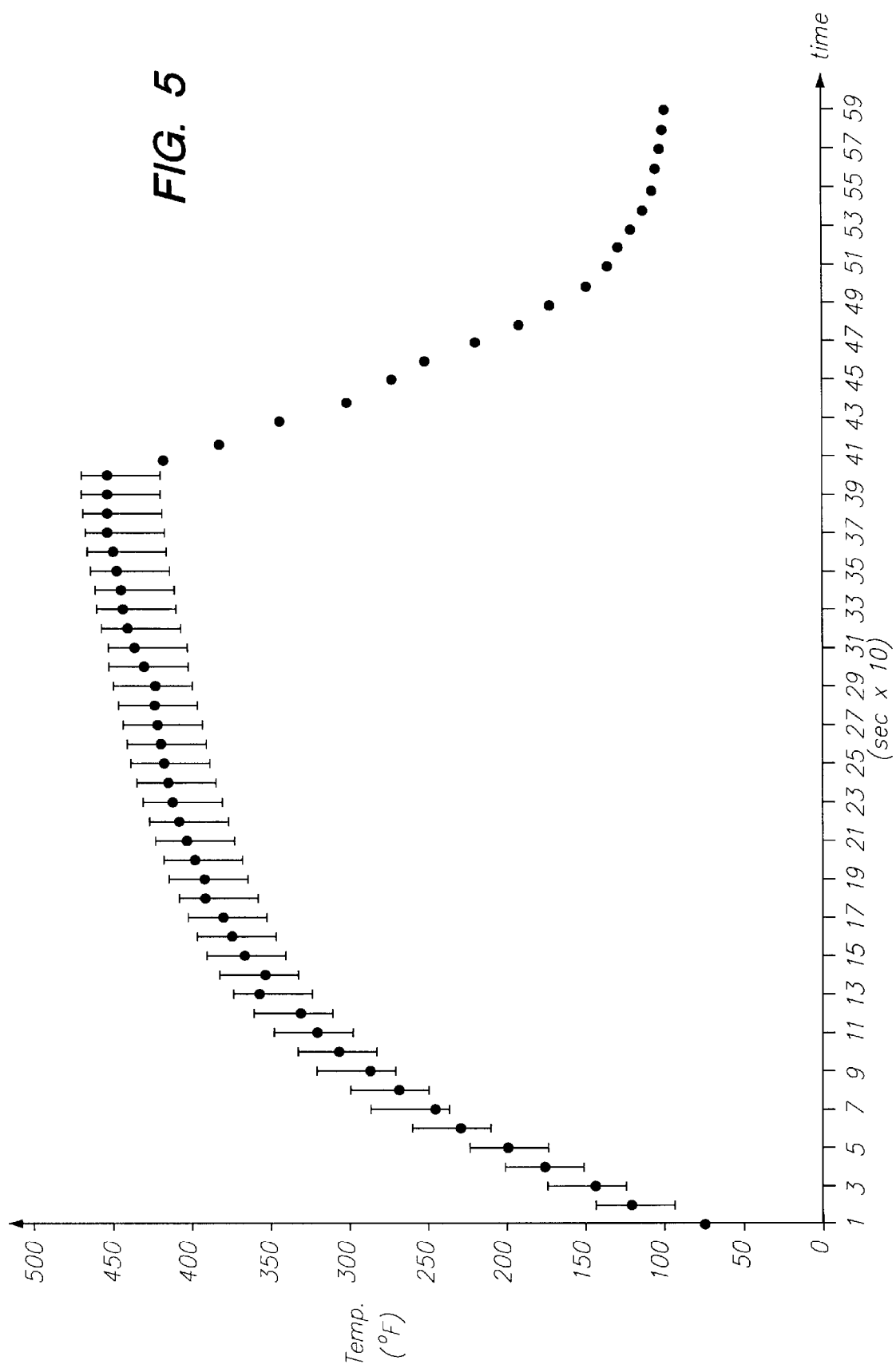

METHOD AND APPARATUS FOR ROASTING COFFEE BEANS IN SMALL QUANTITIES

FIELD OF THE INVENTION

The invention relates to the field of roasting coffee beans. More particularly, the invention relates to the field of roasting coffee beans in quantities suitable for home, office use or commercial lab.

BACKGROUND OF THE INVENTION

Coffee beans are typically grown only in regions of the world having a suitable climate. The beans are picked and then transported to various locations around the world as green coffee beans. In their green form, coffee beans can be kept for relatively long periods before roasting without diminishing the taste and quality of the brewed coffee.

The process of roasting the green coffee beans, however, is relatively complex in that it causes chemical reactions within the beans which greatly affect the taste and quality of the brewed coffee. In fact, the roasting process is considered by many to be both an art and a science. Accordingly, commercial coffee roasting is typically performed by professionals, known as Roast Masters, who undergo extensive study and training before they are qualified to roast coffee commercially.

Coffee beans are roasted by applying heat to the beans. Early in the roasting cycle, the green beans begin to turn yellow and some of the moisture is driven out of the beans. As the beans roast, they tend to expand. Soon, a fine skin, referred to as "chaff," begins to separate from the beans. Within a few minutes, heated water driven from the beans causes an audible sound to occur. This is referred to as "first crack." After the first crack, the beans develop rather quickly, moving in and out of various stages and shades of brown, until a "second crack" occurs. During this period, oils accumulate on exterior of the beans, resulting in a caramelized appearance. The second crack occurs when oils developed within the beans are released in much the same way as the water is released during the first crack.

Depending upon the desired roast, the roasting process is stopped somewhere between just before the first crack, resulting in a light tan and dry roast, to just after the second crack, resulting a dark and oily roast. Because the beans develop quickly during this period, they must be monitored closely so that the roasting cycle can be stopped at just the right moment. Typically, the roasting cycle is stopped by removing the source of heat and by quenching the beans with cool air.

Due to the difficulty of ensuring that the coffee beans are roasted to just the right stage in the roasting process and then quickly quenched, coffee beans are typically roasted in commercial quantities before they are delivered to the consumer. Unfortunately, once the beans are roasted, they begin losing flavor immediately and, within a week, the flavor can be significantly diminished. Therefore, by the time the consumer receives the roasted beans and uses them for brewing coffee, much of the flavor has been lost.

A number of coffee bean roasters have been developed for roasting coffee beans in the home and which include means for automatically stopping the roasting process. For example, U.S. Pat. No. 4,494,314 to Gell discloses a coffee roaster suitable for home use that roasts small quantities of coffee beans. According to this patent, the beans are roasted by air which is forced through a heating element and, then, through louvered slots in an oven chamber. A thermostat mounted near the heating element maintains a preset temperature. A roast selector switch allows the user to select a desired roast. In one embodiment, the roasting process is stopped by a mechanical or electronic timer. In an alternate embodiment, sounds made by the roasting beans are detected and utilized to stop the roasting process. In yet another embodiment, photodetectors compare the darkness of the beans to the darkness of a previously roasted bean to stop the roasting process.

A drawback to these embodiments is that the doneness of the beans may vary from batch to batch. For example, in the timer embodiment, variations in the quantity, size and moisture content of the beans to be roasted is likely to affect the amount of time required to roast the beans to a desired doneness. A drawback to utilizing the microphone is that variations in doneness may be caused by the microphone detecting noises other than those made by the beans. In addition, the microphone must be able to withstand relatively high temperatures. In the embodiment utilizing photodetectors, variations in doneness may result from subjecting the control bean and the roasting beans to unequal amounts of incident light and from changing levels of light reflected from the roasting beans as they move with the heated air. In addition, the photodetectors and control chamber add to the complexity of the device, and a previously roasted bean of desired doneness may not be readily available.

U.S. Pat. No. 3,964,175 to Sivetz discloses a coffee roaster in which the roasting process is stopped when the beans reach a preselected temperature. The temperature of the roasting beans is measured by a thermocouple probe inserted into the roasting chamber at a location in which the probe contacts fluidized beans and heated air. A drawback to this approach is that coffee beans generally undergo significant changes in doneness (e.g. from light tan to dark brown) with relatively small changes in temperature. The accuracy of measurements for small temperature changes in coffee beans decreases with volume and weight of the sample size. Thus, the temperature measurement may not accurately reflect the doneness of the beans.

Therefore, what is needed is a technique for automatically roasting coffee beans to desired doneness accurately and consistently. What is further needed is a technique for automatically roasting coffee beans to desired doneness that is suitable for home or office use.

SUMMARY OF THE INVENTION

The invention is a method and apparatus for automatically roasting coffee beans to a desired doneness. Preferably, the invention can roast a quantity of beans suitable for home or office use, such as for a single cup or a single pot of brewed coffee. The invention includes a roasting chamber having an upper portion joined with a lower portion. The upper portion is cylindrical, while the lower portion is funnel-shaped, having sides which slope toward an opening in the bottom of the chamber. A fan forces air through a heating element and then through the opening in the bottom of the roasting chamber. When beans are placed in the chamber, a stream of heated air lifts beans located directly over the opening until they fall out of the stream, allowing other beans to be gravitationally pulled over the opening. Accordingly, the beans continuously circulate in a fountain-like manner, and receive a uniform roast. Preferably, the opening in the bottom of the roasting chamber is covered by a screen having apertures that are small enough to prevent beans from falling through, but large enough to provide sufficient airflow through the opening to circulate and roast the beans.

A temperature probe is positioned in the roasting chamber so as to contact the circulating beans. Preferably, the temperature probe is positioned outside the heated air stream to avoid directly sensing the temperature of the heated air stream. Consequently, the temperature probe senses a temperature representative of the actual temperature of the beans, rather than a temperature of the heated air.

To roast a charge of green coffee beans, the beans are placed in the roasting chamber and a desired doneness is selected. The fan and heating element are then activated. As the beans are roasted, the temperature is periodically sensed with the temperature probe. The rate at which the temperature of the beans rises is monitored. The power supplied to the heating element and or the fan speed are controlled to maintain the rate of heating within preselected limits. In addition, the sensed temperature is periodically cumulated over time, forming a cumulated value. At any point in time during the roasting process, the cumulated value is highly representative of the doneness of the beans. When the cumulated value reaches a value representative of the desired doneness, the heating element is disabled. To quench the beans, the fan remains turned on for a short period after the heating element is disabled. Roasting green coffee beans according to the invention results is uniform roasting from batch to batch.

A cover positioned over the roasting chamber includes a channel. When the cover is in a first position, the channel directs hot air and chaff into a filter. The filter captures the chaff while venting the hot air. When the cover is in a second position, the channel serves as pour spout for pouring the roasted beans out of the roaster, such as into a grinder. Also, when the cover is in the second position, the filter can be removed for cleaning.

The invention avoids problems associated with complexity, such as unreliability and expense to manufacture. Because during the roasting process, the rising temperature of the beans is maintained within preselected limits and the doneness of the beans is determined by monitoring the cumulated value, the invention avoids the difficultly in that significant changes in doneness can occur despite relatively small changes in temperature. Roasting coffee beans according to the invention results in a tightly controlled degree of doneness which is repeatable from one batch of green coffee beans to another.

BRIEF DESCRIPTION OF THE DRAWINGS

FIG. 3 illustrates a top view of the roasting chamber according to the present invention.

FIG. 5 illustrates a graph of coffee been temperature vs. time for roasting a sample charge of coffee beans.

FIG. 6 illustrates a graph of the cumulated temperature value vs. time for roasting the sample charge of coffee beans.

DETAILED DESCRIPTION OF THE PREFERRED EMBODIMENT

Figure 1:
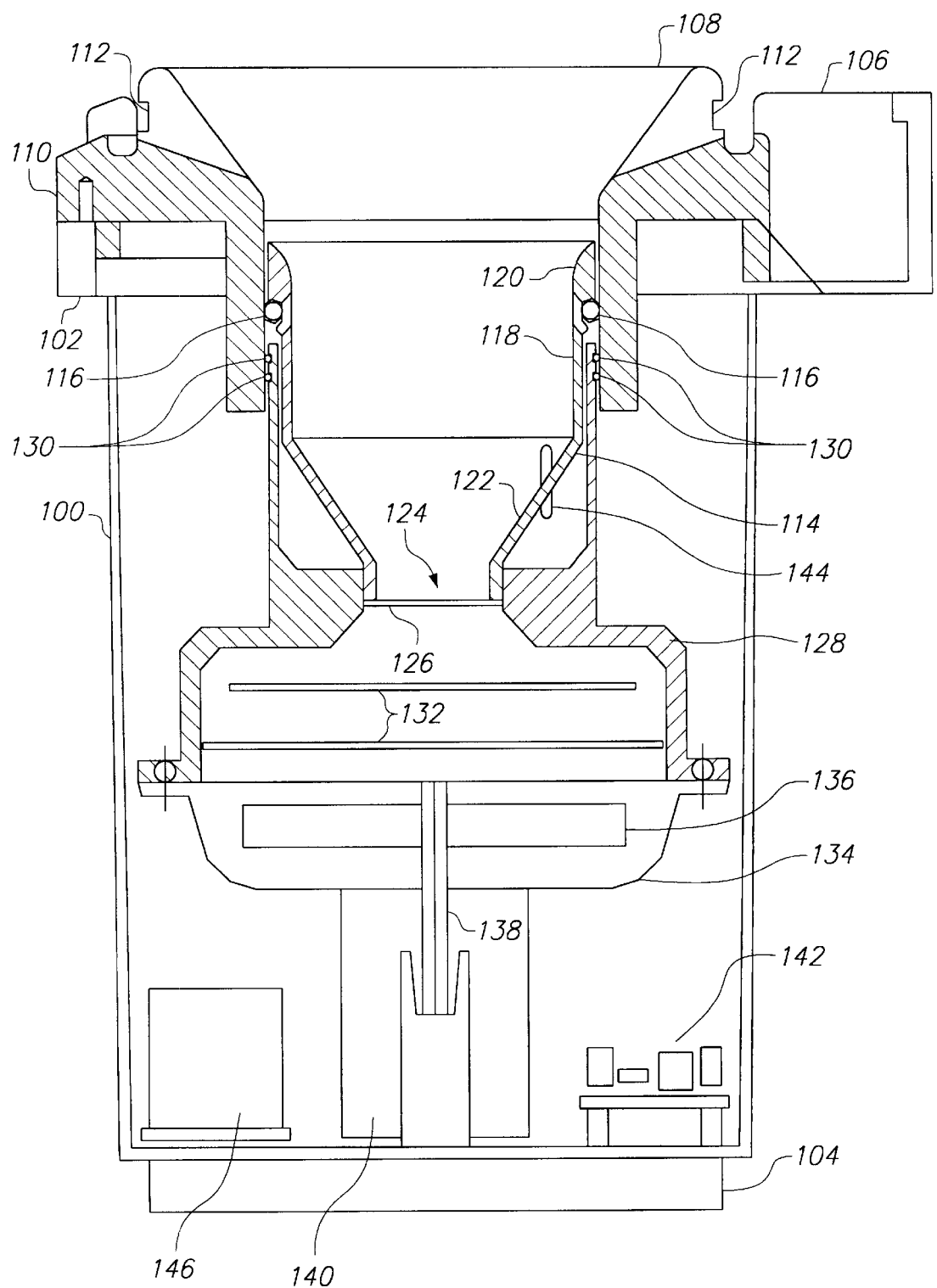
FIG. 1 illustrates a front sectional view of the coffee bean roaster according to the present invention.
Figure 7:
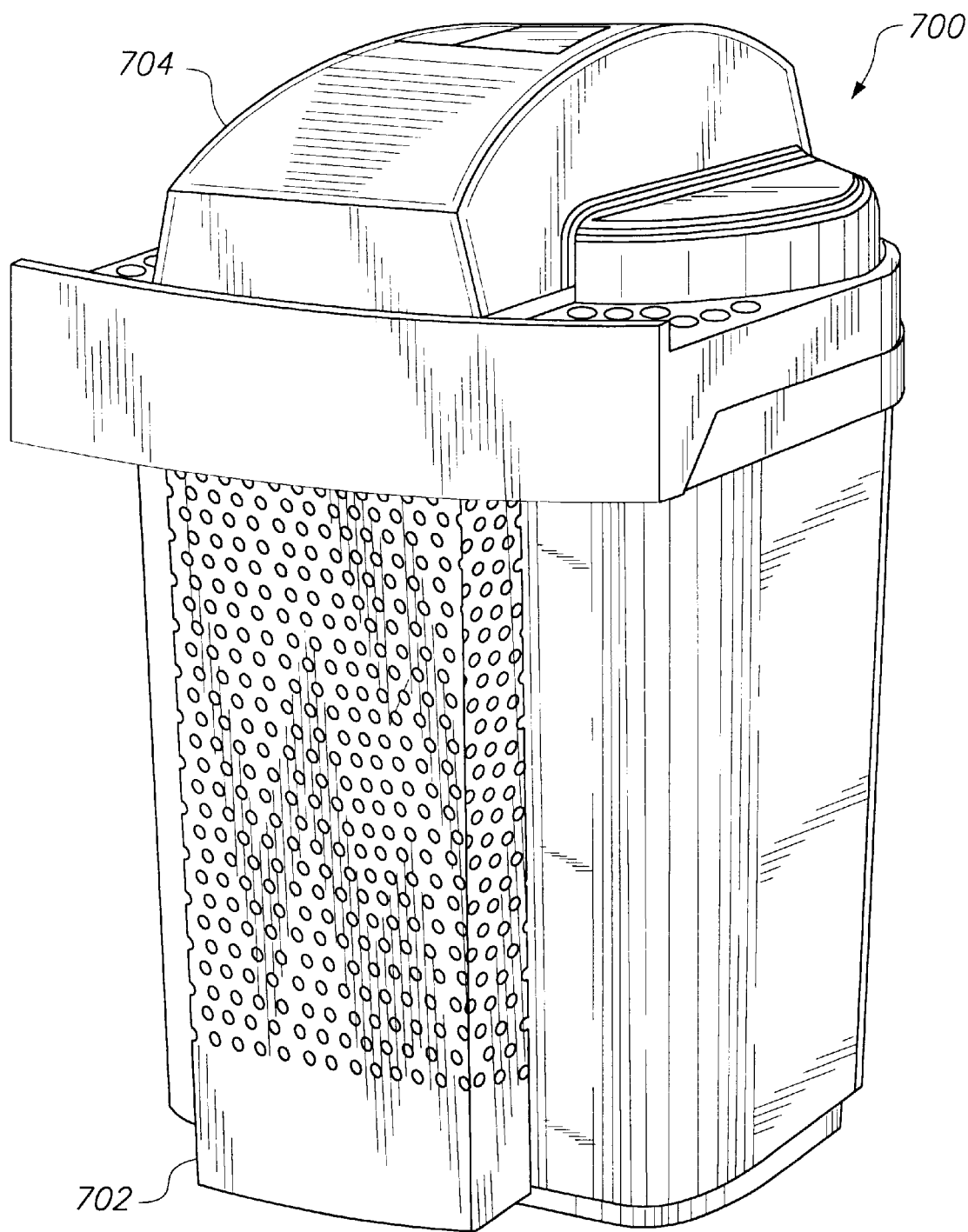
FIG. 7. illustrates a perspective view of the coffee bean roaster according to the present invention.
Figure 8:
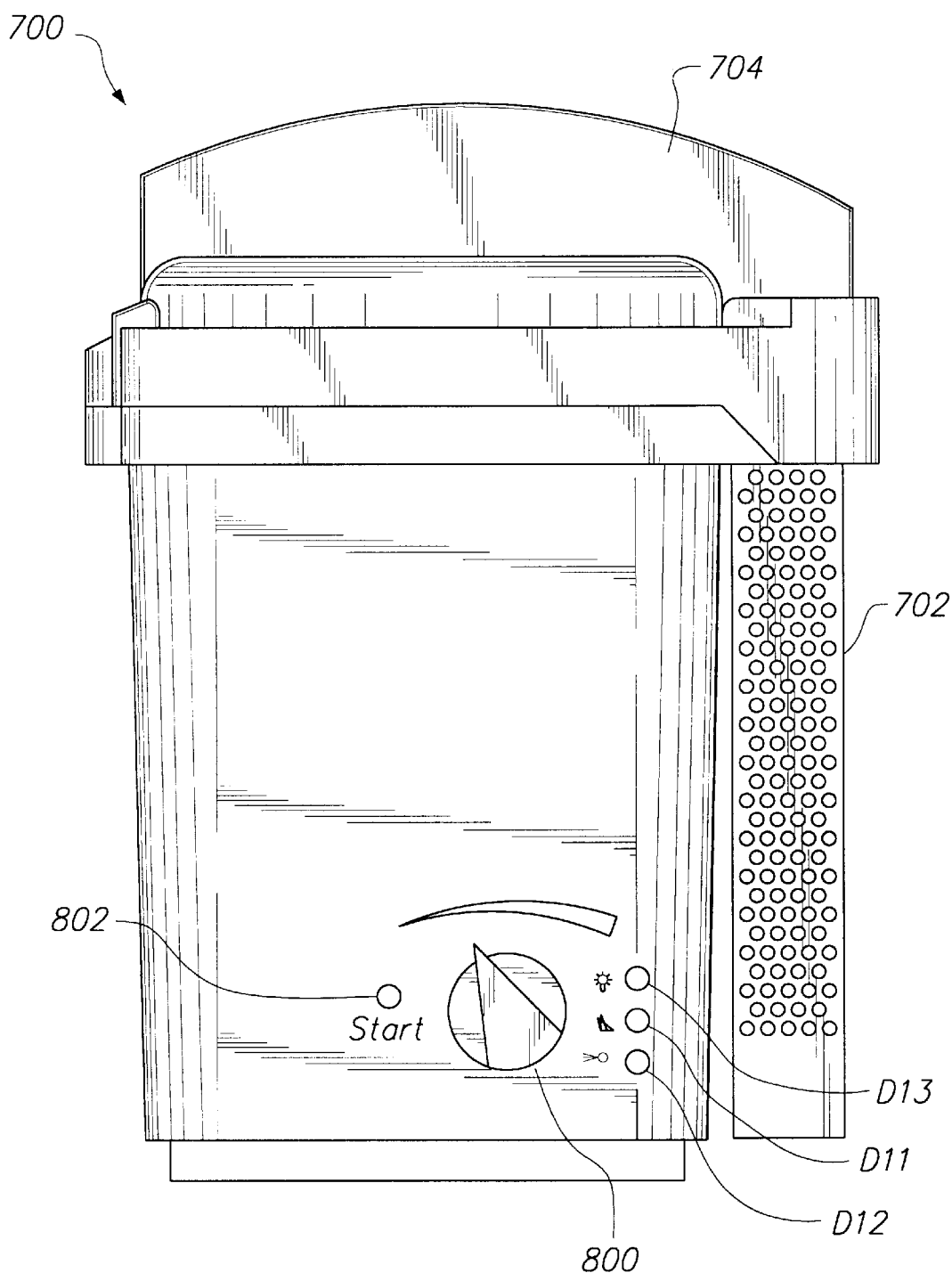
FIG. 8 illustrates a front elevational view of the coffee bean roaster according to the present invention with a cover installed in a first position for roasting coffee beans.
Figure 9:
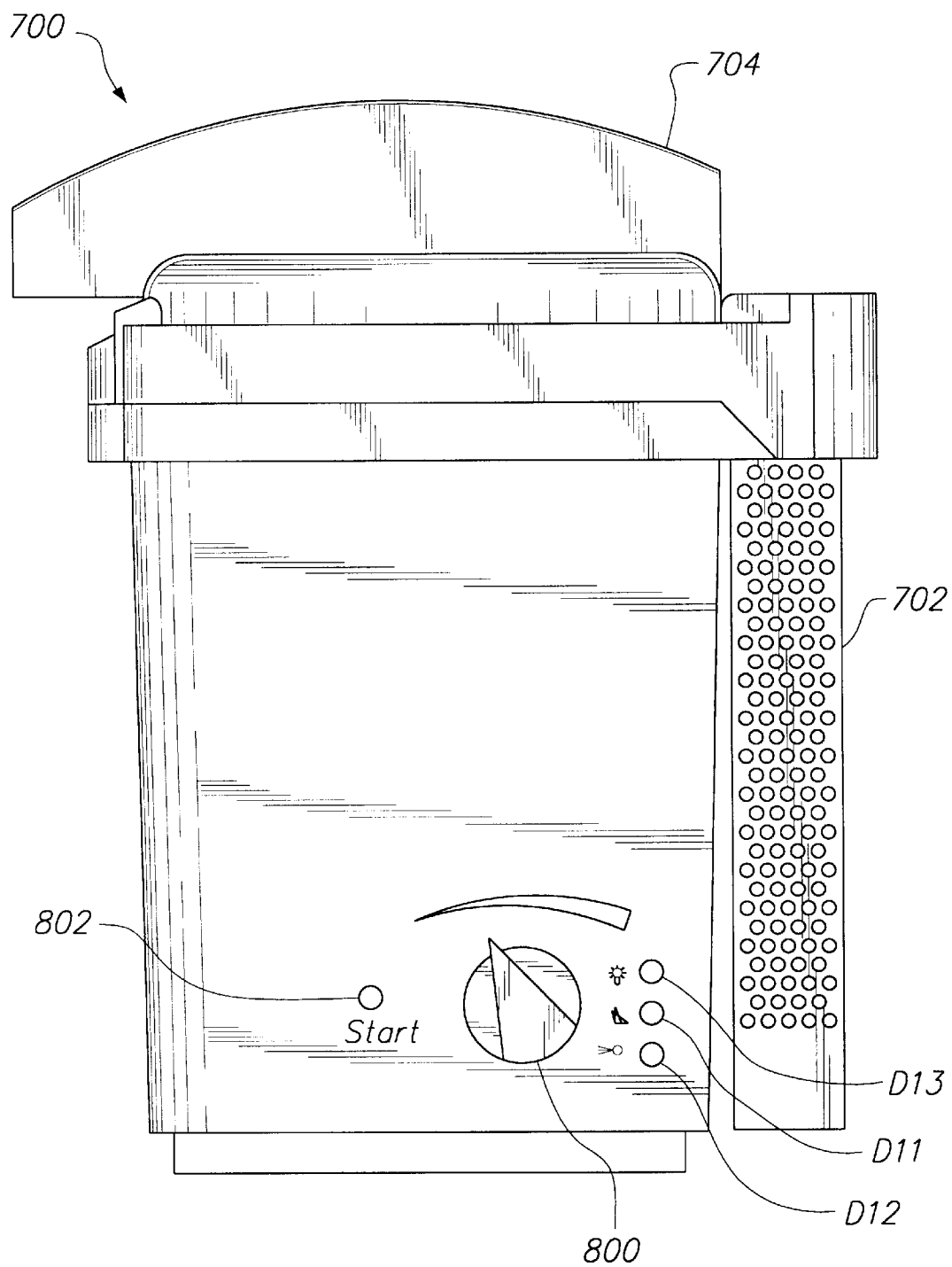
FIG. 9 illustrates a front elevational view of the coffee bean roaster according to the present invention with the cover installed in a second position for pouring roasted coffee beans out of the roaster.

FIG. 1 illustrates a front sectional view of the coffee bean roaster according to the present invention. A housing 100 for the coffee bean roaster includes a head unit 102 and a base 104. The head unit 102 includes a chaff collector bracket 106, a fill funnel 108 and roasting chamber bracket 110. The heat unit 102 also includes a notch 112 about its periphery for rotatably accepting a removable cover 700 (FIGS. 7–9). The roasting chamber bracket 110 is sealed to a roasting chamber 114, with an O-ring 116. The roasting chamber 114 includes an upper portion 118 which is substantially cylindrical and includes a top opening having a radiused portion 120 which is forms a junction with the roasting chamber bracket 110. The roasting chamber 114 also includes a lower portion 122 contiguously joined to the upper portion 116. The lower portion 122 is substantially funnel-shaped with sides sloping inwardly and forming an opening 124 in the bottom of the roasting chamber 114.

A screen 126 is placed over the opening 124 to prevent coffee beans placed in the roasting chamber 114 from falling through the opening 124, while allowing heated air to enter the opening 124 from a heater cone 128. The heater cone 128 fits snugly around the external periphery of the opening 124 and the screen 126 to prevent heated air from escaping around the opening 124. In addition, O-rings 130 are provided to seal the heater cone 128 to the roasting chamber bracket 110. Preferably, the O-rings 116 and 130 are formed of silicone rubber for its resiliency and ability to withstand relatively high temperatures, though it will be apparent other types of seals can be utilized.

Figure 4A:
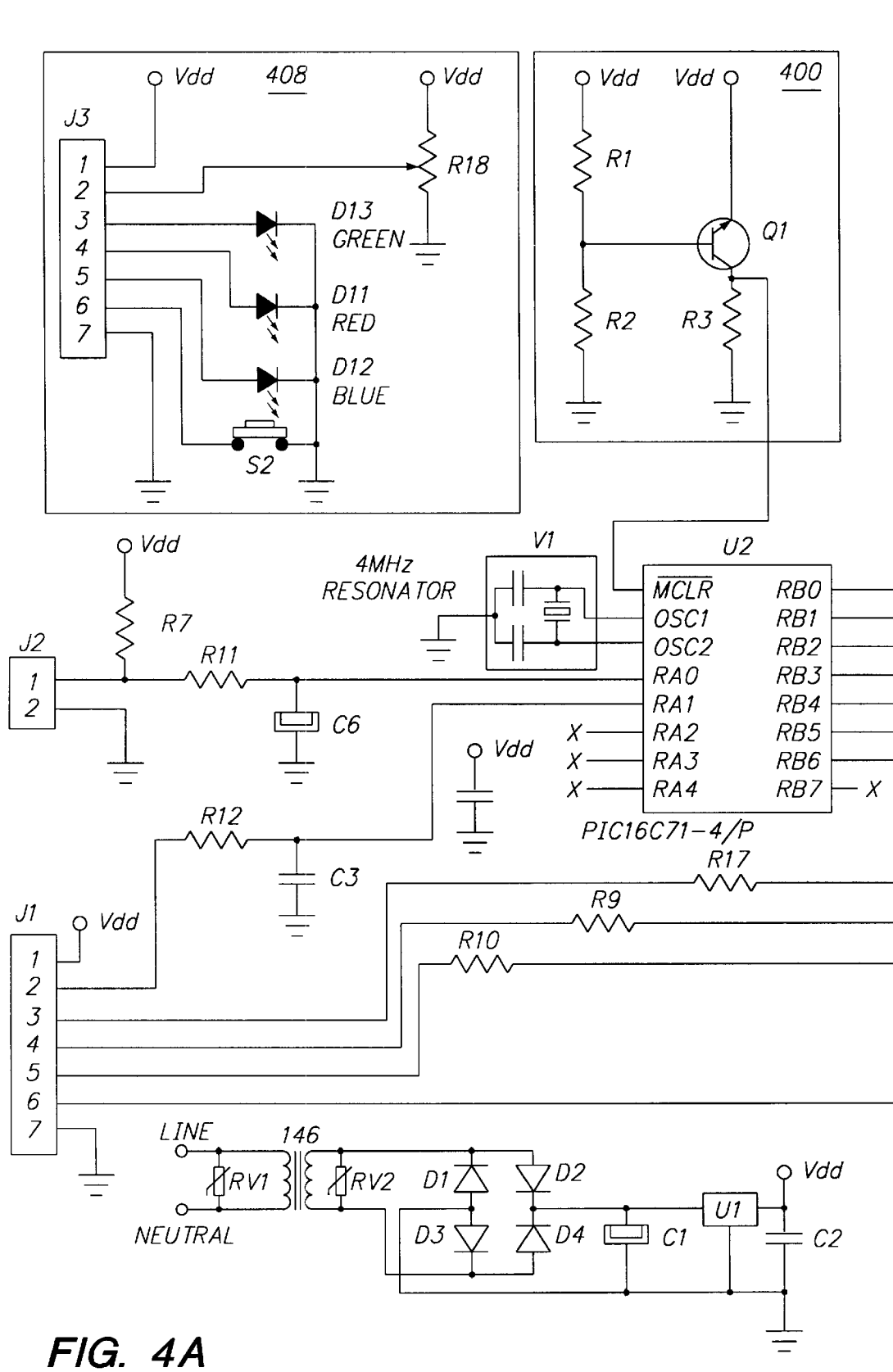
FIG. 4 illustrates a schematic diagram of a circuit according to the present invention for controlling the coffee bean roaster.
Figures 4, 4B:
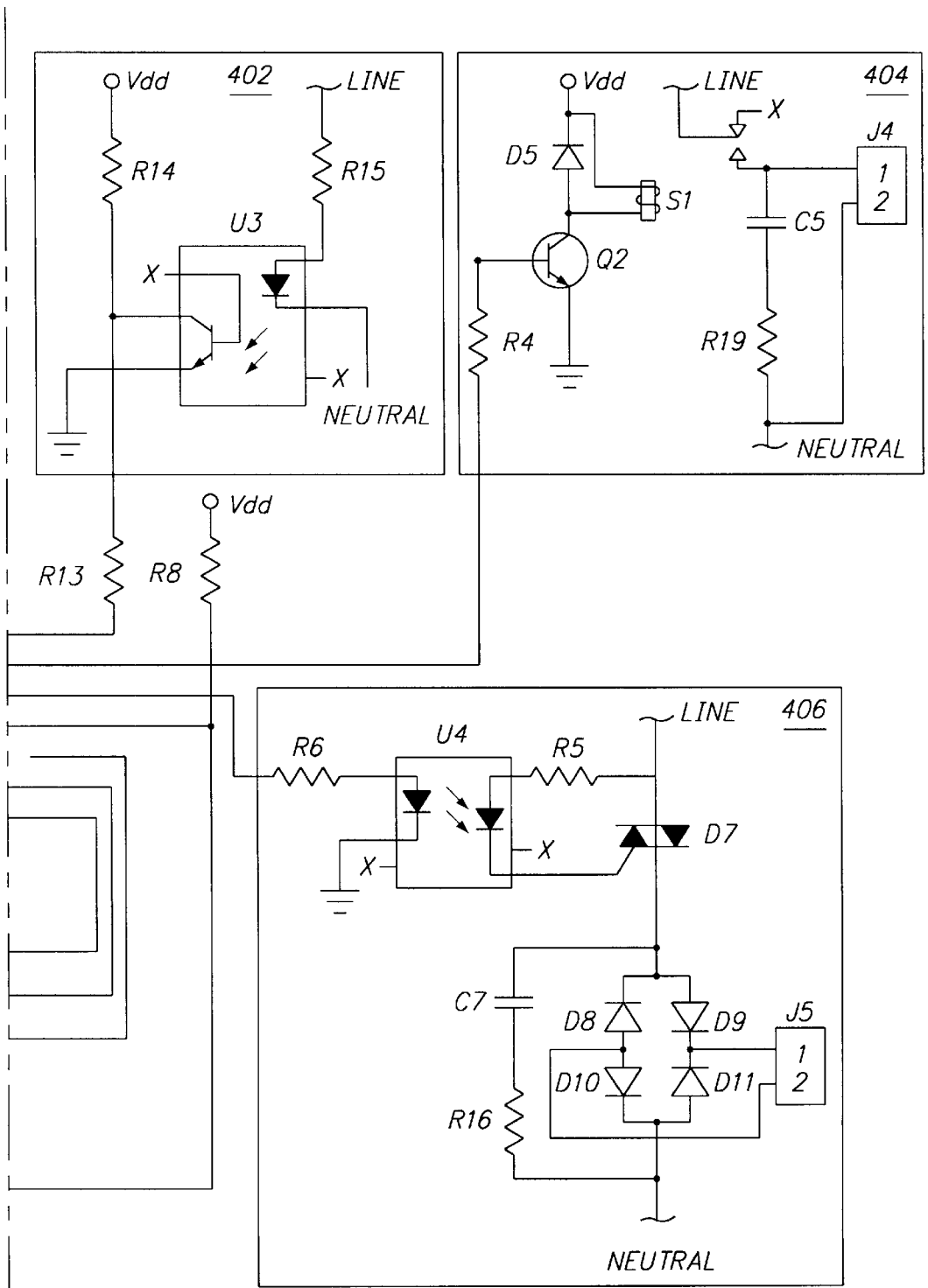

The heater cone 128 contains one or more heating elements 132. The heating elements 132 convert electrical energy into heat energy and are preferably a resistive NiChrome wire, though other types of heating elements can be utilized. Coupled to the heating cone 128 is a fan housing 134. The fan housing 134 contains a fan blade 136 for a fan. The fan also includes a motor shaft 138 with extends into the fan housing 134 for coupling the fan blade 136 to an electric motor 140. The fan blade 136 is preferably of the centrifugal-type for forcing air from inside the housing 100 to enter the fan housing 134 and to pass through the heating element 132, the screen 126, and the opening 124. It will be apparent, however, that other types of fan blades can be utilized. The motor 140 is preferably an DC motor, though an AC motor can be utilized with appropriate modifications. A control circuit 142 is provided for appropriately controlling activation of the fan and the heating element 132. Control of the fan and heating element 132 is based, at least in part, upon a signal representative of a temperature of the roasting beans which is formed by a temperature probe 144. A transformer 146 is provided for converting line voltage levels to a level appropriate for a voltage regulator U1 (FIG. 4). The voltage regulator U1 provides power for the control circuit 142.

The heating element is mounted in a thermally resistant mounting bracket of a material such as mica (not shown) to avoid risk of fire. This mounting bracket preferably includes vertically disposed channels to collimate the air flow and avoid swirling of the coffed beans in the chamber.

Figure 2:
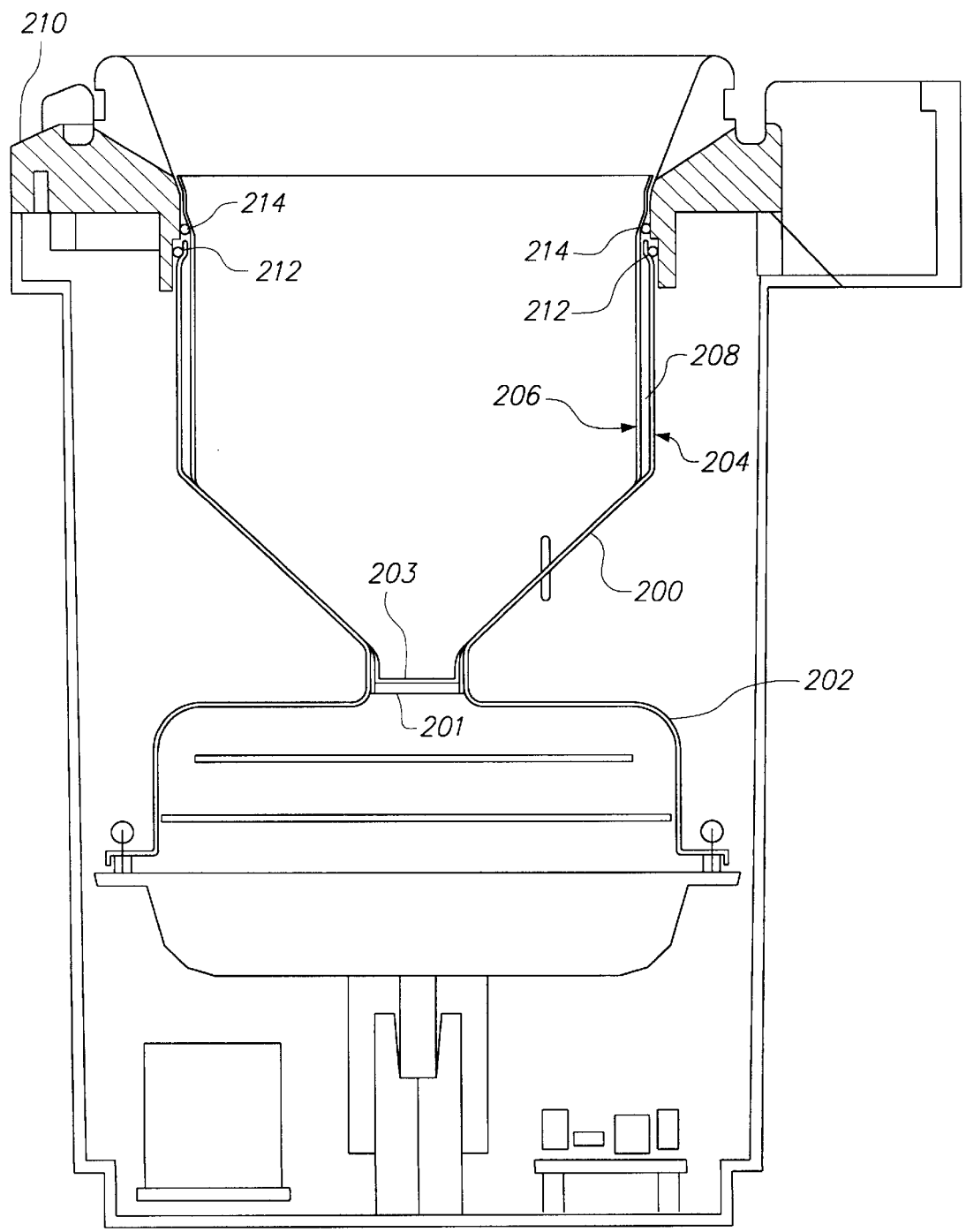
FIG. 2 illustrates a front sectional view of an alternate embodiment of the coffee bean roaster according to the present invention.

FIG. 2 illustrates a front sectional view of an alternate embodiment of the coffee bean roaster according to the present invention. FIG. 2 differs from FIG. 1 in that the roasting chamber 200 and heater cone 202 illustrated in FIG. 2 are preferably formed of a stamped material, preferably sheet metal, whereas, the roasting chamber 114 and heater cone 128 illustrated in FIG. 1 are preferably formed of a molded material, preferably high temperature plastic. In addition, the roasting chamber 200 is somewhat larger than the roasting chamber 114 illustrated in FIG. 1. It will be understood, however, that dimensions of either embodiment can be altered. In a cylindrical portion of the roasting chamber 200, an outer chamber 204 is separated from an inner chamber 206 by an air space 208. The air space 208 provides insulation for reducing heat loss through the walls of the roasting chamber 200. The outer chamber 204 is sealed to a head unit 210 by an O-ring 212, while the inner chamber 206 is sealed to the head unit 210 by an O-ring 214. Additionally, the outer chamber 204 includes a filter screen 201, and the inner chamber 206 includes a second filter screen 203. Thus, when the inner chamber 206 is removed for cleaning or other reasons, the first filter screen 201 protects the fan and lower unit. The remaining elements are substantially the same as those illustrated in FIG. 1.

FIG. 3. illustrates a top view of the roasting chamber 114, 200 according to the present invention. FIG. 3 illustrates the cylindrical shape of the roasting chamber 114, 200, and also illustrates the thermal probe 144 and the screen 126.

FIG. 4 illustrates a schematic diagram of a circuit according to the present invention for controlling the coffee bean roaster. A first terminal of a primary winding of the transformer 146 is coupled to a first terminal of an over-voltage protector RV1 and to a LINE terminal for receiving AC line voltage. A second terminal of the primary winding of the transformer 146 is coupled to a second terminal of the over-voltage protector RV1 and to a NEUTRAL terminal for coupling the transformer 146 to a return line. A first terminal of a secondary winding of the transformer 146 is coupled to a first terminal of an over-voltage protector RV2, to a cathode of a diode D1 and to an anode of a diode D2. A second terminal of the secondary winding of the transformer 146 is coupled to a second terminal of the over-voltage protector RV2, to a cathode of a diode D3 and to an anode of a diode D4.

A cathode of the diode D2 and a cathode of the diode D4 are coupled to a first terminal of a capacitor C1 and to an input terminal of a voltage regulator U1. An anode of the diode D and an anode of the diode D3 are coupled to a second terminal of the capacitor C1 and to a ground node. An output terminal of the voltage regulator U1 is coupled to a DC supply node Vdd and to a first terminal of a capacitor C2. A ground terminal of the voltage regulator U1 and a second terminal of the capacitor C2 are coupled to the ground node.

A microcontroller U2 is preferably a PIC16C71-4/P, eight-bit, eprom-based microcontroller having on-board analog-to-digital converters and high-current capacity input/output terminals. In addition, the microcontroller U2 preferably contains an on-chip program store which is appropriately programmed to control the coffee bean roaster according to the teachings contained herein. It will be apparent, however, that other controller circuits can be utilized. For example, the microcontroller U2 can be a PIC16C711-4/P.

An $\overline{MCLR}$ terminal of the microcontroller U2 is coupled to a brown-out reset circuit 400. The brown-out rest circuit 400 includes resistors R1, R2, R3 and a pnp bipolar transistor Q1. A first terminal of the resistor R1 and an emitter of the transistor Q1 are coupled to the supply node Vdd. A second terminal of the resistor R1 is coupled to a first terminal of the resistor R2 and to a base of the transistor Q1. A collector of the transistor Q1 is coupled to a first terminal of the resistor R3 and to the $\overline{MCLR}$ terminal of the microcontroller U2. A second terminal of the resistor R2 and a second terminal of the resistor R3 are coupled to the ground node. The coffee roaster operates correctly when the DC supply voltage Vdd is within a certain range. The brown out reset circuit 400 resets the microcontroller U2 if the DC supply voltage falls below this range (e.g. when the supply voltage falls below 4.11 volts).

If the PIC16C711-4/P is utilized for the microcontroller U2, the brown-out reset circuit 400 is replaced with a 4.7 Kohm resistor coupled from the DC supply node Vdd to the $\overline{MCLR}$ terminal of the PIC16C711-4/P microcontroller U2.

An oscillator terminal OSC1 of the microcontroller U2 is coupled to a first terminal of resonator V1. The resonator V1 is preferably crystal or ceramic. A second terminal of the resonator V1 is coupled to an oscillator terminal OSC2 of the microcontroller U2. A ground terminal of the resonator V1 is coupled to the ground node. Preferably, a clock rate for the microcontroller is 4 MHz.

An RB0 terminal of the microcontroller U2 is coupled to a zero crossing detector 402 through a resistor R13. The zero crossing detector 402 includes resistors R14, R15 and an optical isolator U3. A first terminal of the resistor R15 is coupled to the AC line voltage terminal LINE. A second terminal of the resistor R15 is coupled to a first input terminal of the optical isolator U3. A second input terminal of the optical isolator U3 is coupled to the return line NEUTRAL. A first terminal of the resistor R14 is coupled to the supply node Vdd. A second terminal of the resistor R14 is coupled to an output terminal of the optical isolator U3 and to a first terminal of the resistor R13. A ground terminal of the optical isolator U3 is coupled to the ground node. A second terminal of the resistor R13 is coupled to the RB0 terminal of the microcontroller U2.

An RB1 terminal of the microcontroller U2 is coupled to a heater control circuit 404. The heater control circuit 404 includes a diode D5, an npn bipolar transistor Q2, resistors R4 and R19, a switch S1, a capacitor C5 and a connector J4. The supply node Vdd is coupled to a cathode of the diode D5 and to a first terminal of a coil for the relay S1. An anode of the diode D5 is coupled to a second terminal of the coil for the relay S1 and to a collector of the transistor Q2. A base of the transistor Q2 is coupled to a first terminal of the resistor R4. A second terminal of the resistor R4 is coupled to the RB1 terminal of the microcontroller U2. An emitter of the transistor Q2 is coupled to the ground node. Because the current output of the microcontroller U2 is insufficient to drive the relay S1, the transistor Q1 provides current to drive the relay S1.

The AC line voltage LINE is coupled to a first terminal of the relay S1. A second terminal of the relay is coupled to a first terminal of the capacitor C5 and to a first terminal of the connector J4. A second terminal of the capacitor C5 is coupled to a first terminal of the resistor R19. A second terminal of the resistor R19 and a second terminal of the connector J4 are coupled to the return line NEUTRAL. The connector J4 connects the heater elements 132 (FIG. 1) to the heater control circuit 404.

An RB2 terminal of the microcontroller U2 is coupled to a motor control circuit 406. The motor control circuit 406 includes resistors R5, R6, R16, an optical isolator U4, a triac D7, diodes D8, D9, D10, D11, a capacitor C7 and a connector J5. The RB2 terminal of the microcontroller U2 is coupled to a first terminal of the resistor R6. A second terminal of the resistor R6 is coupled to a first input terminal of the optical isolator U4. A second input terminal of the optical isolator U4 is coupled to the ground node. A first output terminal of the optical isolator U4 is coupled to a first terminal of the resistor R5. A second terminal of the resistor R5 is coupled to the AC line voltage terminal LINE and to an anode terminal of the triac D7. A second output terminal of the optical isolator U4 is coupled to a grid terminal of the triac D7. A cathode terminal of the triac D7 is coupled to a first terminal of the capacitor C7, to a cathode of the diode D8 and to an anode of the diode D9.

A cathode of the diode D9 is coupled to a cathode of the diode D11 and to a first terminal of a connector J5. An anode of the diode D8 is coupled to an anode of the diode D10 and to a second terminal of the connector J5. A cathode of the diode D10, an anode of the diode D11 and a first terminal of the resistor R16 are coupled to the return line NEUTRAL. A second terminal of the resistor R16 is coupled to a second terminal of the capacitor C7. The connector connects the motor control circuit 406 to the fan motor 140 (FIG. 1).

The motor 140 is preferably a 120 volt DC motor though it is driven by the AC line voltage rectified by a diode bridge comprising the diodes D8–D11. The microcontroller 140 monitors the AC line voltage for zero crossings based upon a signal received from the zero crossing detector 402. Upon each zero crossing, the microcontroller U2 activates the optical isolator U4, which, in turn, activates the triac D7 for driving the motor 140. An amount of delay between sensing a zero crossing and activating the triac D7 controls the voltage applied to the motor 140 and, thus, controls the speed of the motor 140. It will be apparent, however, that with appropriate modifications to the drive circuitry, the motor 140 could be an AC motor.

An RA0 terminal of the microcontroller U2 is coupled to a first terminal of a capacitor C6 and to a first terminal of resistor R11. A second terminal of the capacitor C6 is coupled to the ground node. A second terminal of the resistor R11 is coupled to a first terminal of a connector J2 and to a first terminal of a resistor R7. A second terminal of the resistor R7 is coupled to the supply node Vdd. A second terminal of the connector J2 is coupled to the ground node. The connector J2 connects to the temperature probe 144 (FIG. 1), preferably, via a twisted pair of wires. Preferably, the temperature probe 144 is a glass-encapsulated precision thermistor (e.g. 2% tolerance) which provides an analog signal representative of a temperature of the roasting coffee beans to the microcontroller U2. An analog-to-digital converter within the microcontroller U2 converts this analog signal to a digital value. Preferably, the temperature probe 144 is formed by encapsulating the thermistor within an electrically insulating, thermally conductive, epoxy that can withstand relatively high temperatures, though it will be apparent that other materials can be used. Alternately, the temperature probe 144 includes a radiant heat detector, rather than a thermistor.

The supply node Vdd is coupled to a first terminal of a connector J1. A second terminal of the connector J1 is coupled to a first terminal of a resistor R12. A second terminal of the resistor R12 is coupled to a first terminal of a capacitor C3 and to an RA1 terminal of the microcontroller U2. A second terminal of the capacitor C3 is coupled to the ground node. A third terminal of the connector J1 is coupled to a first terminal of a resistor R17. A second terminal of the resistor R17 is coupled to an RB6 terminal of the microcontroller U2. A fourth terminal of the connector J1 is coupled to a first terminal of a resistor R9. A second terminal of the resistor R9 is coupled to an RB5 terminal of the microcontroller U2. A fifth terminal of the connector J1 is coupled to a first terminal of a resistor R10. A second terminal of the resistor R10 is coupled to an RB4 terminal of the microcontroller U2. A sixth terminal of the connector J1 is coupled to an RB3 terminal of the microcontroller U2 and to a first terminal of a resistor R8. A second terminal of the resistor R8 is coupled to the supply node Vdd. A seventh terminal of the connector J1 is coupled to the ground node.

The connector J1 connects to a user interface circuit 408 by mating with a corresponding connector J3. The user interface circuit 408 includes potentiometer R18, a green light emitting diode D13, a red light emitting diode D11, a blue light emitting diode D12 and a SPST momentary-on switch S2. A first terminal of the connector J3 provides the supply node Vdd to the user interface circuit 408. The supply node Vdd is coupled to a first terminal of the potentiometer R18. A second terminal of the connector J3 is coupled to a variable terminal of the potentiometer R18. A third terminal of the connector J3 is coupled to an anode of the green diode D13. A fourth terminal of the connector J3 is coupled to an anode of the red diode D11. A fifth terminal of the connector J3 is coupled to an anode of the blue diode D12. A sixth terminal of the connector J3 is coupled to a first terminal of the switch S2. A seventh terminal of the connector J3 provides the ground node to the user interface circuit 408. A second terminal of the potentiometer R18, a cathode of the diode D13, a cathode of the diode D11, a cathode of the diode D12, and a second terminal of the switch S2, are all coupled to the ground node.

The user interface circuit 408 provides a user of the coffee bean roaster an ability to select a desired doneness (e.g. light tan and dry to dark brown and oily) for the coffee beans by adjusting the potentiometer R18 via a control knob 800 (FIGS. 8 and 9). The potentiometer R18 forms an analog voltage level at the RA1 terminal of the microcontroller U2 which is representative of the desired doneness. The microcontroller U2 converts this analog voltage level into a digital value for controlling roasting of the coffee beans as explained herein.

Successive operating states for the coffee bean roaster are indicated by appropriately illuminating the diodes D11, D12 and D13. The green diode D13 indicates that the roaster is ready to begin roasting. The red diode D11 indicates that the roasting process is underway. The blue diode D12 indicates that the beans are being quenched with cool air. The switch S2 is preferably activated by the user pressing a start/stop button 802 (FIGS. 8 and 9).

On power up (when the AC power is applied to the transformer 146 and the voltage regulator U1 generates the supply voltage Vdd), the microcontroller U2 first ensures that the fan and heating element 132 are turned off. Then, a temperature sensed by the temperature probe 144 is compared to a predetermined room temperature limit. If the sensed temperature is above this limit, the red diode D11 flashes to indicate that the system has entered an error mode and enters a cooling cycle. If the sensed temperature is below this limit, the system enters a ready mode in which the green diode D13 is illuminated and the microcontroller U2 waits for the switch S2 to be activated.

When the switch S2 is activated, the system enters a roast mode in which the red diode D11 is illuminated, the heating element 132 is activated and the fan is operated at an initial, relatively high, rate of speed. Periodically, a digital value is obtained from reading the potentiometer R18. From this digital value, a value representative of a desired doneness is calculated based upon predetermined minimum and maximum values. The minimum value represents a light tan and dry roast while the maximum value represents a dark brown and oily roast. The adjustment of the potentiometer R18 selects a roast from within this range.

During the roasting mode, temperature sensed by the temperature probe 144 is read at periodic intervals as a digital value. For each interval, the temperature sensed by the temperature probe 144 is cumulated. Thus, each successive temperature value is summed to a previous total, forming a cumulated value. The cumulated value can be thought of as representing an integration of the sensed temperature over time. As such, at each point in time during the roasting process, the cumulative value is representative of a total amount of thermal energy to which the roasting beans have been subjected. This cumulated value is highly indicative of the doneness of the beans. To determine when to stop the roasting process, the cumulated value is compared to the value representative of the desired doneness.

During the roasting process, the rate at which the sensed temperature is rising is also monitored and controlled. This is done by comparing the sensed temperature to a range of expected values for each interval. These expected values are stored in the program memory for the microcontroller U2. The heating element 132 is controlled based upon this comparison in order to maintain the temperature within the range for each interval. As explained in more detail with reference to FIG. 5, this technique ensures that the rate of temperature increase is controlled to be within a range of optimum values for roasting the coffee beans. As a result, there is a high degree of consistency in the amount of doneness for each batch of coffee beans. Note that the calculated rate can be thought of as representing a differentiation of the sensed temperature with respect to time. Alternately, this technique is omitted, in which case, the heater 132 element is simply kept turned on during the roasting process. In yet another embodiment, a thermostat is utilized to monitor and maintain the temperature of the heated air within a predetermined range.

In an alternate embodiment, the rate at which the temperature rises is controlled, but the sensed temperature values are not cumulated. In such case, the roasting process is stopped when the sensed temperature reaches a predetermined value or after a predetermined time interval of roasting has elapsed.

Additionally, during the roasting process, the speed of the fan is reduced to compensate for the lessening of the weight of the beans as moisture is driven from the beans. This ensures that the beans continue to circulate in the roasting chamber without blowing out of the roasting chamber.

If, after a predetermined period of time, the sensed temperature fails to rise, a component failure is assumed, such as a broken wire in the heating element 132. In such case, the system enters an error mode wherein the fan and heating element 132 are shut down and the blue diode D12 flashes. Conversely, of the sensed temperature rises too quickly, a ventilation problem is assumed, such as a clogged chaff filter. In such case, the system enters an error mode in which the green diode D13 flashes.

Assuming no error modes are entered, when the microcontroller U2 determines that the cumulated value has reached the value representative of the desired doneness, the roast mode is automatically stopped and the system enters a cooling mode. The roasting mode can also be manually stopped and the cooling mode entered by the user activating the switch S2. In the cooling mode, the heating element 132 is turned off, the blue diode D12 is illuminated, and the fan continues to operate. This quenches the roasted coffee beans, preventing residual heat energy contained in the beans from continuing to roast the beans. The cooling mode preferably lasts for a predetermined period (e.g. from one to three minutes) during which any user input is ignored. Alternately, the cooling mode lasts until the sensed temperature falls below a predetermine temperature (e.g. 100 degrees F). Upon completion of the cooling mode, the system resets and the green diode D13 is illuminated.

The advantage of stopping the roasting process according to the present invention can be seen graphically with reference to FIGS. 5 and 6. Note that the preferred interval for sensing the temperature is every ten seconds, though a different interval can be utilized. FIG. 5 illustrates a graph of coffee been temperature vs. time for roasting a sample charge of coffee beans to a dark brown and oily degree of doneness. FIG. 5 also illustrates that for each ten second interval, as the temperature is rising, the sensed temperature is maintained with a predetermined range. This ensures that the rate at which the temperature of the beans is rising is controlled in an optimal and highly repeatable manner. In FIG. 5, the curve slopes upwardly as the beans are roasting (roast mode) and downwardly during the quenching process (cooling mode). Note that as the beans approach the desired doneness, the temperature curve tends to flatten out. This flattening typically begins near or upon the first crack. Therefore, the time period during which the doneness of the beans is rapidly changing approximately coincides with the flattening of the temperature curve. Thus, it can be seen that stopping the roasting process based solely upon a then-current temperature of the beans can yield inconsistent results.

FIG. 6 illustrates a graph of the cumulated value vs. time for roasting the sample charge of coffee beans. The graph illustrated in FIG. 6 represents a cumulation of the temperature values from FIG. 5, summed at 10 second intervals. As can be seen from FIG. 6, the curve for the cumulated value has a relatively linear slope over time, especially toward the right side of graph where the beans are approaching the desired degree of doneness. Because the curve does not include portions of flattening, stopping the roasting process based upon the then-current cumulated value yields highly consistent results. This is especially true when the rate of temperature increase is also controlled.

FIG. 7. illustrates a perspective view of the coffee bean roaster according to the present invention. As illustrated in FIG. 7, a cover 700 and a chaff collector 702 are installed to the coffee bean roaster. The chaff collector 702 includes filter preferably having an outer layer having coarse openings and an inner layer (not shown) having finer openings. Note that the cover 700 includes a curved channel 704 which assists in directing the chaff which is blown upwardly by the stream of heated air into the chaff collector 702. In addition, the heated air is vented through the chaff collector 702.

FIG. 8 illustrates a front elevational view of the coffee bean roaster according to the present invention with the cover 700 installed in a first position for roasting coffee beans. In this position, the curved channel 704 of the cover 700 directs the heated air and chaff into the chaff collector 702. FIG. 8 also illustrates a control knob 800 which is rotatable for controlling the potentiometer R18, the diodes D11–D13, and the start button 802 for controlling the switch S2.

FIG. 9 illustrates a front elevational view of the coffee bean roaster according to the present invention with the cover 700 installed in a second position for pouring roasted coffee beans out of the roaster, such as into a grinder. In this position, the curved channel 704 of the cover 700 serves as a pour spout for pouring out the coffee beans when the roaster is tilted. Note that in this position, the chaff collector 704 can be removed for cleaning.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention.

Specifically, it will be apparent to one of ordinary skill in the art that the device of the present invention could be implemented in several different ways and the apparatus disclosed above is only illustrative of the preferred embodiment of the invention and is in no way a limitation. For example, it would be within the scope of the invention to vary the values of the various components, voltage levels, time intervals, temperature levels, relative dimensions and relative quantities disclosed herein.

What is claimed is:

1. An apparatus for roasting coffee beans, the apparatus comprising:
   a. chamber having a first opening for accepting heated air into the chamber and a second opening for exhausting air from the chamber;
   b. a probe for forming a sensed value representative of a temperature within the chamber; and
   c. a circuit coupled to the probe for cumulating the sensed value over time for forming a cumulated value and for inhibiting flow of the heated air into the first opening when the cumulated value reaches a first predetermined value.

2. The apparatus according to claim 1 wherein the chamber includes a substantially funnel-shaped portion.

3. The apparatus according to claim 2 wherein the chamber includes a substantially cylindrical portion joined to the substantially funnel-shaped portion.

4. The apparatus according to claim 1 wherein after the flow of heated air is inhibited, flow of cooler air enters the first opening for quenching the beans.

5. The apparatus according to claim 4 wherein during the flow of cooler air, the sensed value is compared to a second predetermined value and when the sensed value reaches the second predetermined value, the flow of cooler air is inhibited.

6. The apparatus according to claim 1 wherein the cumulated value is formed by cumulating the sensed value at each of a series of time intervals.

7. The apparatus according to claim 1 wherein the sensed value representative of the temperature in the chamber rises in response to the heated air and wherein a rate at which the sensed value rises is controlled.

8. The apparatus according to claim 7 wherein the rate at which the sensed value rises is monitored by comparing the sensed value to a range of values corresponding to each of a series of time intervals.

9. The apparatus according to claim 7 wherein the rate at which the sensed value rises is controlled by controlling a heating element positioned outside the first opening.

10. The apparatus according to claim 1 further comprising a cover for the second opening, wherein the cover is selectively positioned in a first position and in a second position wherein the first position causes the heated air to be directed into a filter and wherein the second position causes the coffee beans to pour from the chamber when the chamber is tilted.

11. The apparatus according to claim 1 wherein the beans are circulated by the heated air and wherein an amount of heated air is reduced from an initial amount thereby compensating for moisture removed from the beans.

12. A method of roasting coffee beans, the method comprising steps of:
   a. heating the beans;
   b. monitoring a value representative of a temperature of the beans;
   c. cumulating the value representative of the temperature of the beans over time for forming a cumulated value;
   d. comparing the cumulated value to a first predetermined value; and
   e. inhibiting the step of heating the beans when the integrated value reaches the first predetermined value.

13. The method according to claim 12 further comprising a step of cooling the beans after the cumulated value reaches the first predetermined value.

14. The method according to claim 13 wherein the step of cooling the beans continues until the value representative of the temperature of the beans reaches a second predetermined value.

15. The method according to claim 12 wherein the step of heating the beans comprises flowing heated air over the beans.

16. The method according to claim 15 wherein the heated air circulates the beans in a roasting chamber.

17. The method according to claim 16 wherein the roasting chamber includes a substantially funnel-shaped portion having an opening in the bottom where the heated air enters the roasting chamber.

18. The method according to claim 16 further comprising a step of reducing an amount of heated air utilized for circulating the beans thereby compensating for a moisture reduction in the beans.

19. The method according to claim 12 wherein the step of cumulating the value is performed by cumulating the value at each of a series of time intervals.

20. The method according to claim 12 wherein the value representative of the temperature of the beans rises in response to the step of heating the beans and further comprising a step of controlling a rate at which the value rises.

21. The method according to claim 20 wherein the step of controlling the rate at which the value rises includes a step of comparing the value to a range of values corresponding to each of a series of time intervals.

22. The method according to claim 20 wherein the step of controlling the rate at which the value rises includes a step of controlling a heating element.

23. An apparatus for roasting coffee beans, the apparatus comprising:
   a. chamber having a first opening for accepting heated air into the chamber and a second opening for exhausting air from the chamber wherein a temperature within the chamber rises in response to the heated air;
   b. a probe for forming a sensed value representative of a temperature within the chamber; and
   c. a circuit coupled to the probe for comparing the sensed value at each of a series of periodic time intervals to a range of corresponding values and for controlling flow of heated air into the chamber in response to the comparison for controlling a rate at which the temperature within the chamber rises.

24. The apparatus according to claim 23 wherein the flow of heated air is stopped after a predetermined time period.

25. A method of roasting coffee beans, the method comprising steps of:
   a. heating the beans thereby causing a temperature of the beans to rise;
   b. monitoring a value representative of the temperature of the beans;
   c. at each of a series of periodic time intervals, comparing the value to a range of corresponding values; and
   d. controlling the step of heating the beans in response to the step of comparing thereby controlling a rate at which the temperature of the beans rises.

26. The method according to claim 25 further comprising a step of inhibiting the step of heating a predetermined time period after commencing the step of heating.

* * * * *

UNITED STATES PATENT AND TRADEMARK OFFICE
CERTIFICATE OF CORRECTION

PATENT NO. : 5,960,561

DATED : Oct. 5, 1999

INVENTOR(S) : Daniel J. Parodi et al.

It is certified that error appears in the above-identified patent and that said Letters Patent is hereby correct as shown below:

Column 5, line 46, please delete "D" and insert therefor --D1--.

Signed and Sealed this

Twenty-fifth Day of April, 2000

*Attest:*

Q. TODD DICKINSON

*Attesting Officer*     *Director of Patents and Trademarks*